Patented May 30, 1933

1,912,142

UNITED STATES PATENT OFFICE

CARLL W. HUNT, OF LOS ANGELES, AND ALEXANDER H. McRAE, OF GLENDALE, CALIFORNIA, ASSIGNORS, BY MESNE ASSIGNMENTS, TO THE JOHNSON-MARCH CORPORATION, OF LONG ISLAND CITY, NEW YORK, A CORPORATION OF DELAWARE

BITUMINOUS ARTICLE OF MANUFACTURE

No Drawing.   Application filed January 30, 1929.   Serial No. 336,326.

This invention relates to an article of manufacture consisting of bituminous compositions or to an article of manufacture containing bituminous material to a very large extent. More particularly, this invention relates to articles of manufacture made from bituminous compositions or ingredients, such composition and ingredients having relatively low melting points when in combination; whereas, the completed article of manufacture is resistant to deformation when exposed to heat.

The invention also relates to a method whereby bituminous constituents or compositions may be combined so as to form an article of manufacture capable of resisting deformation when such article is exposed to heat.

Our invention relates to compositions containing or consisting of bituminous compounds. By "bituminous compounds" we mean to include the various forms of asphalts, such as air or steam refined petroleum asphalt, natural asphalt, such as those of the Trinidad type, as well as asphaltic pyrobitumens, such as elaterite, wurtzilite, albertite, etc. We also include, for the purposes of this description, native asphalts or asphaltites such as gilsonite, grahamite and similar materials within the scope of the term "bituminous compounds". It is also to be understood that such term includes compounds containing such asphalts or asphaltic materials, together with flux oils, solvents or fillers and reenforcing agents. For example, by a "bituminous composition" is meant a compound consisting of petroleum asphalt, gilsonite and a mineral filler such as finely divided diatomaceous earth.

Asphaltic compositions of the character embraced by our invention are used extensively for water-proofing, roofing and other purposes. For example, such compositions are generally applied while in a hot fluid condition, to pipe so as to form a waterproof protective coating thereon. Similarly, such compositions may be applied to wood, concrete piling or other concrete structures, or may be used for filling in expansion joints, or may be used for roofing purposes and the like.

Generally, compositions of this nature are supplied to the trade in barrels or drums. The melting point of these compositions range from 120 degrees to 170 degrees Fahrenheit. These compositions soften, or are soft at normal temperatures, however. Generally, the drums or barrels are broken open on the job and the semisolid or solid bituminous composition (depending upon the temperature of the air or the time of the day) broken up into small pieces which are then fed to a kettle, pot or other container in which the composition is reduced to a fluid condition by means of heat. During the winter season or in northern latitudes, such bituminous compositions are fairly solid and may be easily broken into small pieces As a matter of fact, during the winter months, such compositions become very brittle and shatter easily when a large lump thereof is struck with a hammer or axe. In warmer climes or during the summer months, the compositions become fairly plastic and deform with great readiness. When a barrel of such composition is open, it is difficult to remove the composition therefrom because of the viscous adhesive quality of the material. When a large lump of the material is struck with an axe for example, in order to separate it into smaller pieces capable of being fed to a kettle or melting pot, it is almost impossible to withdraw the axe. The compositions deform with great readiness when exposed to sunlight and leak out of barrels upon the ground, thereby picking up large quantities of dirt and other foreign material, which either renders such material unfit for use or greatly impairs the character of the composition.

An object of this invention is to disclose and provide a method of so combining the ingredients of a bituminous composition as to prevent or retard the deformation of such compositions when exposed to heat.

Another object is to provide a bituminous container for bituminous compositions, said container becoming a part of the composition when reduced to a fluid condition.

Another object is to provide a bituminous composition capable of withstanding exposure to heat without becoming fluid.

In carrying out our invention, bituminous compositions consisting of bituminous material of both high and low melting point are used. Low melting point bituminous materials such as, for example, petroleum asphalts, comprise the major portion of the resulting product. In addition to such low melting point materials, other bituminous materials such as, for example, gilsonite or compositions containing gilsonite which are of a relatively high melting point are also used. For purposes of illustration, it may be desired to manufacture a bituminous composition containing 75% by weight of petroleum asphalt of about 40 degrees penetration and having a melting point of about 125 degrees F. An asphalt of this character is soft at ordinary temperatures of 70 degrees or 80 degrees F., and when exposed to the action of sunlight, becomes fluid or exhibits plastic flow.

In addition to an asphalt of this character, it may be desired to employ 25 percent by weight of a high melting point bituminous material, such as gilsonite. Gilsonite has a melting point of between 250 degrees and 350 degrees F. and does not exhibit plastic flow to any marked extent at temperatures below 150 degrees to 175 degrees F.

The melting point of a bituminous composition containing 75 percent of asphalt and 25 percent of gilsonite, as hereinabove described, will be about 155 degrees to 170 degrees F. A ball or other fixed shape molded from such composition will readily deform and flow when exposed to direct sunlight or when exposed to normal air temperatures of the temperate zone. A composition of this character cannot be readily shipped in barrels because of disadvantages which have been mentioned hereinabove. For example, while in storage such composition will leak out of a barrel having a relatively small opening therein.

We have discovered that articles of manufacture can be made of a composition of the above character and such articles will not deform when exposed to sunlight, or exhibit plastic flow. This unusual result may be obtained by forming a homogeneous mixture employing only a portion of the gilsonite with all of the softer asphalts and then applying the remaining quantity of gilsonite as an outer coating to such composition.

For example, a mixture is made using 75 parts of asphalt and 15 parts of gilsonite and blocks or other desired shapes molded or cast from such composition. These blocks are then coated with ten parts of gilsonite. The gilsonite forms a hard heat-proof covering for the blocks, thereby preventing the blocks from becoming deformed when exposed to heat or, for example, to direct sunlight.

Blocks or other molded bodies made as hereinabove described, may be readily handled, shipped and used. They may be dusted with a finely divided material, such as diatomaceous earth, talc or stone dust to prevent adjoining blocks from sticking to each other when such blocks are stacked or stored. The blocks may be of a size which renders them easily manipulated and inserted into melting pots, kettles and the like, without the necessity of subdividing such blocks. It is to be understood that the coating of gilsonite or other material capable of remaining solid at temperatures encountered in practice forms an integral portion of the block and of the composition. In other words, the coating is not to be removed or destroyed separately, but forms a part of the filling material.

Instead of using gilsonite or similar asphaltite or asphaltic pyrobitumen alone as a coating material, a composition of such asphaltite together with an oil, flux, other asphalt or mineral filler may be employed.

In all events the coating material should have a relatively high melting point so as to withstand direct sunlight and the effect of heat without plastic flow.

Instead of dipping molded blocks of a low melting point bituminous composition in a bath of high melting point material, all or part of the high melting point material may be molded into open-topped containers having a suitable wall thickness of say $\frac{1}{16}$ to $\frac{1}{4}$ of an inch. The low melting point bituminous composition or ingredient which is to form a part of the final product may then be poured or placed into such containers and the exposed surface of such low melting point filler may then be covered or painted with the high melting point bituminous ingredient or ingredients.

Our invention therefore relates to a method of so combining and arranging the ingredients of bituminous compositions as to form a bituminous composition or article normally exhibiting plastic flow or deformation when exposed to heat or direct sunlight, which will not deform or exhibit plastic flow when subjected to such temperatures or heat. Furthermore, our invention permits the formation of molded articles from low melting point bituminous compositions which will exhibit the characteristics of high melting point bituminous materials. It permits us to ship and store low melting point bituminous compositions without the use of liquid-tight metallic or wooden containers.

Numerous changes and modifications may be made both in the method employed in segregating and combining the various ingredients of bituminous compositions and in the character and quantity of the materials employed, and our invention includes all such changes and modifications as come within the scope of the appended claims.

We claim:

1. As an article of manufacture, a body composed of bituminous ingredients which, when mixed together, form a composition subject to deformation upon exposure to sunlight, said body being capable of resisting exposure to sunlight without appreciable deformation, said body comprising a continuous outer coating containing high melting point ingredients and a filler containing low melting point ingredients.

2. As an article of manufacture, a bituminous body capable of resisting exposure to sunlight without appreciable deformation, said body consisting of a container of bituminous material and a filler of bituminous material, the bituminous material composing the container being of higher melting point than said filler.

3. As an article of manufacture, a bituminous body capable of resisting exposure to sunlight without appreciable deformation, said body consisting of a continuous container composed of bituminous material containing gilsonite and a filler of asphalt, said container being of higher melting point than said asphalt, the relative quantities of asphalt and container being such that when the container and asphalt are reduced to a homogeneous mixture, such mixture exhibits plastic flow when exposed to the heat of sunlight.

4. As an article of manufacture, a bituminous body consisting of a central filler containing asphalt and a continuous outer coating containing asphaltite, said outer coating completely enveloping said central filler whereby the resulting bituminous body is capable of resisting exposure to sunlight without appreciable deformation.

5. As an article of manufacture, a bituminous body consisting of an outer container of high melting point bituminous ingredients and an inner filler of low melting point bituminous ingredients, said container completely enveloping said filler whereby the resulting bituminous body is capable of resisting exposure to sunlight without appreciable deformation, the high melting point ingredients of said container when homogeneously combined with said filler being capable of forming a composition subject to deformation upon exposure to sunlight.

6. A method of forming bituminous bodies, comprising molding a container of high melting point bituminous ingredients and filling said container with low melting point bituminous ingredients, said high and low melting point ingredients being in quantity adapted to form a body capable of exhibiting plastic flow upon exposure to sunlight when homogeneously mixed together.

7. In a method of forming bituminous bodies, the steps of molding a body from low melting point bituminous ingredients, and then coating said body with high melting point bituminous ingredients in quantities sufficient to form a final bituminous body capable of resisting exposure to sunlight without material deformation, but in proportions adapted to form a body normally exhibiting plastic flow upon exposure to sunlight when said high melting point and low melting point ingredients are homogeneously mixed together.

Signed at Los Angeles, California, this 23rd day of January 1929.

CARLL W. HUNT.
ALEXANDER H. McRAE.